United States Patent
Kang et al.

(10) Patent No.: US 11,396,989 B2
(45) Date of Patent: Jul. 26, 2022

(54) LAMP FOR VEHICLE

(71) Applicant: SL Corporation, Daegu (KR)

(72) Inventors: Da-il Kang, Gyeongsan-si (KR);
Sun-kyoung Park, Gyeongsan-si (KR);
Sanghwa Lee, Gyeongsan-si (KR);
Seokjin Lee, Gyeongsan-si (KR);
Wonhong Jeon, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 17/410,026

(22) Filed: Aug. 24, 2021

(65) Prior Publication Data
US 2022/0090753 A1    Mar. 24, 2022

(30) Foreign Application Priority Data
Sep. 18, 2020    (KR) .................. 10-2020-0120354

(51) Int. Cl.
| | |
|---|---|
| *F21V 5/00* | (2018.01) |
| *F21S 41/25* | (2018.01) |
| *F21S 41/32* | (2018.01) |
| *F21S 43/239* | (2018.01) |
| *F21V 8/00* | (2006.01) |
| *F21W 107/10* | (2018.01) |

(52) U.S. Cl.
CPC .............. *F21S 41/25* (2018.01); *F21S 41/32* (2018.01); *F21S 43/239* (2018.01); *G02B 6/0025* (2013.01); *F21W 2107/10* (2018.01)

(58) Field of Classification Search
None
See application file for complete search history.

(56) References Cited

U.S. PATENT DOCUMENTS

| | | | | |
|---|---|---|---|---|
| 6,193,383 B1 * | 2/2001 | Oniki | ...................... | F21V 13/04 |
| | | | | 362/23.15 |
| 6,811,277 B2 * | 11/2004 | Amano | ................. | F21S 43/247 |
| | | | | 362/346 |
| 7,021,805 B2 * | 4/2006 | Amano | ................. | F21V 7/0091 |
| | | | | 362/307 |
| 2004/0027833 A1 * | 2/2004 | Amano | ................. | F21S 43/241 |
| | | | | 362/517 |
| 2008/0089062 A1 * | 4/2008 | Vennetier | ........... | G02B 19/0071 |
| | | | | 257/E33.071 |
| 2011/0261570 A1 * | 10/2011 | Okada | ................... | F21S 43/239 |
| | | | | 362/311.06 |

* cited by examiner

*Primary Examiner* — Elmito Breval
(74) *Attorney, Agent, or Firm* — United One Law Group LLC; Kongsik Kim; Jhongwoo Peck

(57) ABSTRACT

A lamp for a vehicle includes a light source unit, and a light guide lens unit disposed above the light source unit. The light guide lens unit is configured to allow a distance from a center of the light source unit to a peripheral end to be substantially constant. The light guide lens unit includes a reflection unit disposed at a central portion of one surface of the light guide lens unit for reflecting a light incident from the light source unit from a center of the light guide lens unit toward the peripheral end. Further, the reflection unit includes a diffusion lens unit for diffusing the light incident from the light source unit. Accordingly, a first part of the light incident to the light guide lens unit is reflected by the reflection unit, and a second part of the light incident to the light guide lens unit passes through the reflection unit and is incident to the diffusion lens unit.

11 Claims, 8 Drawing Sheets

(a)

(b)

(a)

(b)

LAMP FOR VEHICLE

CROSS-REFERENCE TO RELATED APPLICATION

This application claims priority to Korean Patent Application No. 10-2020-0120354, filed on Sep. 18, 2020. The aforementioned application is incorporated herein by reference in its entirety.

BACKGROUND

1. Technical Field

The present invention relates to a vehicle lamp, and more particularly, to a vehicle lamp having improved illuminance uniformity to a target point.

2. Description of the Related Art

A vehicle lamp is generally divided into a head lamp installed in the front of the vehicle and a tail lamp installed in the rear of the vehicle. The head lamp of a vehicle is an illumination lamp that illuminates the path ahead of the vehicle, and is also referred to as a headlight. The head lamp requires brightness to identify obstacles on the road ahead of a certain distance at low light conditions (e.g., at night). The tail lamp implements a functional role such as a brake operation indication, a direction indication, or a warning indication. These head lamps and tail lamps also play a large role in aesthetics forming the image of the vehicle.

Considering that the vehicle design is becoming increasingly important in the marketability of a vehicle, the aesthetics of a vehicle lamp can be a very important factor for the marketability of a vehicle.

However, conventional vehicle lamps have a simple configuration including a bulb, which is a light source, and a reflector reflecting the light of the bulb. Therefore, there is a problem in that the shape of the light image of the tail lamp is non-distinctive. Accordingly, a method of increasing the aesthetics of a light image by installing a plurality of light sources such as LEDs has been proposed, but there is a problem in that a large number of light sources are required.

In addition, as the consumers' emotional satisfaction becomes more important, the demand for light images using indirect reflection rather than light images configured in the form of multi-dots is increasing.

Recently, vehicle lamps using a light guide have been provided. The light guide is a member that converts a point-emission image by a light source such as a light emitting diode (LED) into a surface-emission image. By utilizing such a light guide, a linear light image can be implemented with a small number of light sources.

However, the conventional light guide is formed to be elongated in the longitudinal direction and has a light source arranged on a side thereof. For this reason, within the light guide, the region adjacent to the light source appears brighter than other regions.

Accordingly, there is a need for a lamp for a vehicle having a uniform illuminance distribution over a surface where a constant light source is desired even at a location away from the center of the light source.

SUMMARY

An object of the present invention is to provide a vehicle lamp capable of improving surface uniformity by providing a light guide lens unit having its outer periphery at the same distance from a light source.

In addition, an object of the present invention is to provide a vehicle lamp capable of achieving illuminance uniformity by adjusting a distance from a target light emitting surface. In addition, the problem to be solved by the present invention is to provide a lamp for a vehicle that enables internal reflection of light rays near the light source to the outermost part, even to the part far from the light source as well as the part adjacent to the light source. The objects of the present invention are not limited to the objects mentioned above, and other objects not mentioned will be clearly understood by those skilled in the art from the following description.

According to an aspect of the present disclosure, a lamp for a vehicle may include a light source unit; and a light guide lens unit disposed above the light source unit. The light guide lens unit may be configured such that an entire peripheral end thereof has a substantially constant distance from a center thereof. The light guide lens unit may include a reflection unit disposed at a central portion of one surface of the light guide lens unit to cause a light incident from the light source unit to be reflected from the center of the light guide lens unit toward the peripheral end. Further, the reflection unit may include a diffusion lens unit for diffusing the light incident from the light source unit. Accordingly, a first part of the light incident to the light guide lens unit may be reflected by the reflection unit, and a second part of the light incident to the light guide lens unit may pass through the reflection unit and may be incident to the diffusion lens unit.

A light emitting surface may be further provided by being disposed above and spaced apart from the light guide lens unit, and the light guide lens unit may be formed to allow a distance between the light guide lens unit and the light emitting surface to be smaller as it goes from the center toward the peripheral end.

The light guide lens unit may include a central region corresponding to the light source unit and including a flat incident surface; and an annulus region radially extending from the central region and forming a predetermined inclination with respect to the light emitting surface to allow the distance between the light guide lens unit and the light emitting surface to be smaller as it goes toward the peripheral end. The predetermined inclination may be determined to allow the light guide lens unit to emit substantially uniform light to the light emitting surface.

The annulus region of the light guide lens unit may include an optic unit on an upper surface and a lower surface thereof to cause the light reflected from the reflection unit to be reflected within the light guide lens unit or to be diffused to exterior of the light guide lens unit.

The optic unit may include a first optic on the lower surface of the annulus region, which is concavely recessed toward a direction of the upper surface of the annulus region for reflecting the light toward the upper surface of the annulus region.

Further, the optic unit may include a second optic on the upper surface of the annulus region, which is configured to be convex outwardly from the upper surface for diffusing and emitting a part of the light toward the light emitting surface, and for reflecting a remaining part of the light toward the first optic.

The reflection unit may be formed as a reflection groove that is recessed in a conical shape from an upper surface the light guide lens unit to an inside, and the diffusion lens unit may be disposed within the reflection groove.

The diffusion lens unit may be made of a material different from a material of the light guide lens unit. The diffusion lens unit may include a plurality of diffusion beads therewithin. In some embodiments, the diffusion lens unit may be made of a same material as the material of the light guide lens unit, and the plurality of diffusion beads may be made of a material different from the material of the diffusion lens unit and the light guide lens unit.

In the vehicle lamp according to the embodiment of the present invention as described above, surface uniformity can be improved due to the configuration where the peripheral end of the light guide lens unit is substantially equal-distanced from the light source unit.

In addition, in the vehicle lamp according to the embodiment of the present invention, the light guide lens unit may be configured to be inclined at a predetermined angle toward the end from the center of the light source unit, so that the light rays near the light source unit may be internally reflected to the outermost part even to the part far from the light source unit as well as the adjacent part to the light source unit. Further, the vehicle lamp according to the present invention can achieve illuminance uniformity by adjusting the distance from the target light emitting surface.

Effects of the present invention are not limited to the effects mentioned above, and other effects not mentioned will be clearly understood by those skilled in the art from the description of the claims.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
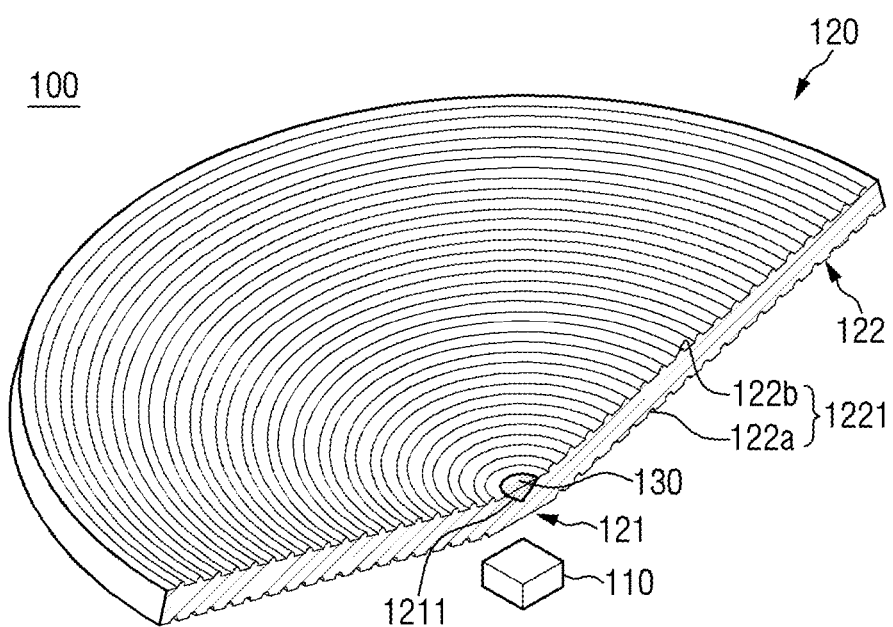
FIG. 1 is a partially cut-away perspective view of a vehicle lamp according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Throughout the specification, like reference numerals in the drawings denote like elements.

In some embodiments, well-known steps, structures and techniques will not be described in detail to avoid obscuring the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the invention are described herein with reference to plan and cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In the drawings, respective components may be enlarged or reduced in size for convenience of explanation.

Hereinafter, the present invention will be described with reference to the drawings for describing the vehicle lamp 100 according to embodiments of the present invention. The vehicle lamp according to an embodiment of the present invention may be used for various lamps installed in a vehicle, such as a head lamp, a tail lamp, a brake lamp, a fog lamp, a daytime running lamp, a turn signal lamp, a backup lamp, and the like. The term "front" as used in this specification may refer to a direction in which the light is irradiated from the vehicle lamp of the present invention. However, the absolute direction that the front means may vary depending on the location or direction, in which the vehicle lamp of the present invention is installed.

Hereinafter, a vehicle lamp 100 for implementing a light image with high uniformity and uniform illuminance distribution on a target surface (hereinafter referred to as 'target light emitting surface 140') can be described with reference to the drawings.

Figure 2:
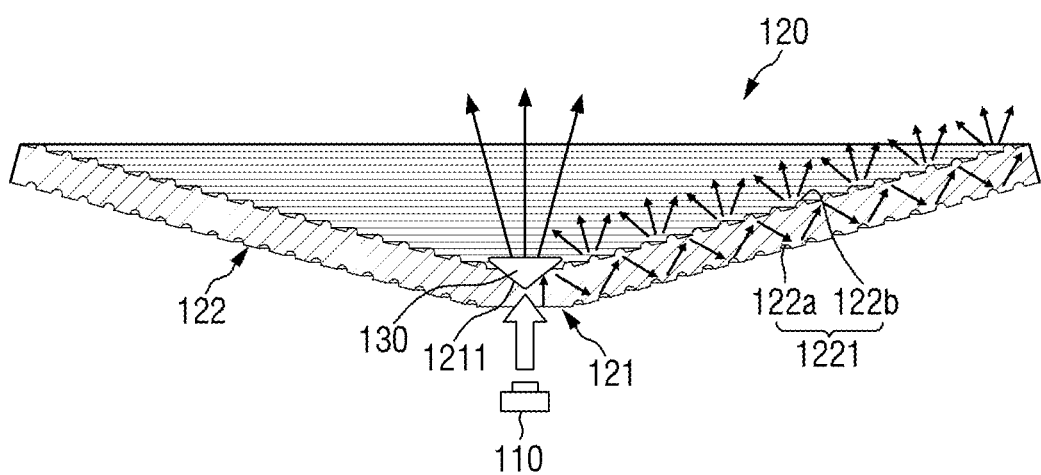
FIG. 2 is a side cross-sectional view of a vehicle lamp according to an embodiment of the present invention.

FIG. 1 is a partially cut-away perspective view of a vehicle lamp 100 according to an embodiment of the present invention. FIG. 2 is a side cross-sectional view of a vehicle lamp 100 according to an embodiment of the present invention. Referring to FIGS. 1 and 2, a vehicle lamp 100 according to an embodiment of the present invention may include a light source unit 110, a light guide lens unit 120, and a diffusion lens unit 130.

The light source unit 110 may be spaced apart from the center of the light guide lens unit 120 that has a disk shape, which will be described later. The light emitted from the light source unit 110 may be incident through the central incident surface of the light guide lens unit 120 and be emitted toward the light emitting surface 140 to be described later through the upper surface of the light guide lens unit 120. Herein, the term "upper" surface may be understood based on the orientation shown in FIG. 2. However, the absolute direction of the "upper" surface may vary depending on the installation orientation of the vehicle lamp 100.

The light source unit 110 of the present invention is described as an LED as an example, but the present invention is not limited thereto. The light source unit 110 may include various types of light sources.

As the light source unit 110 is disposed at or near the center of the light guide lens unit 120 to be described later, the light emitted from the light source unit 110 may be incident on the central portion of the light guide lens unit 120. Further, as a diffusion lens unit 130 to be described later is disposed at the center of the light guide lens unit 120, a part of the light may be incident to the diffusion lens unit 130, and the remaining part of the light may be incident to the interior of the light guide lens unit 120.

The light guide lens unit 120 may be configured to receive the light emitted from the light source unit 110 to reflect it therein, and to emit light toward the upper side (based on the orientation shown in the drawing) of the light guide lens unit 120. The light guide lens unit 120 may be spaced apart from an upper portion of the light source unit 110, and the light guide lens unit 120 may be configured as a light guide having a disc shape with respect to the light source unit 110, or a light guide plate.

Figure 3:
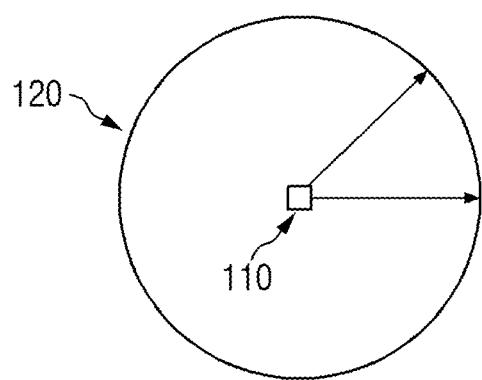
FIG. 3 compares light guide lenses of a vehicle lamp according to embodiments of the present invention.
Figure 3:
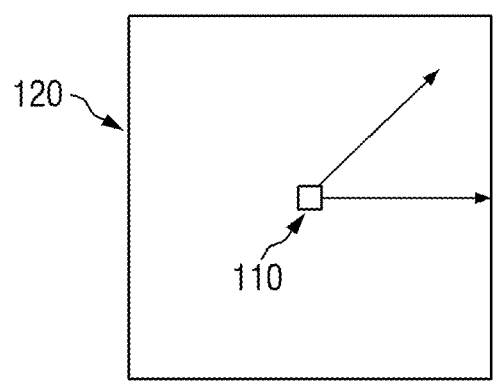

FIG. 3 compares light guide lenses of a vehicle lamp 100 according to embodiments of the present invention. Referring to FIG. 3, as described above, the light guide lens unit 120 of the present invention may be configured in a disk shape as shown in panel (a) of FIG. 3, and such that its substantially entire peripheral end has a constant distance from the position of the light source unit 110. In comparison, in the case of a polygon, for example, a quadrangle, as shown in panel (b) of FIG. 3, the distance from the light source unit 110 to the peripheral end of the light guide lens unit 120 is not constant. Accordingly, as the light propagates, the brightness of the light may relatively decrease, and thus the surface uniformity may be degraded. However, as shown in panel (a) of FIG. 3, since the light guide lens unit 120 of the present invention is configured such that the distance from the light source unit 110 to the peripheral end is constant due to the circular shape, the surface uniformity may be improved even to the outer part.

Figure 4:
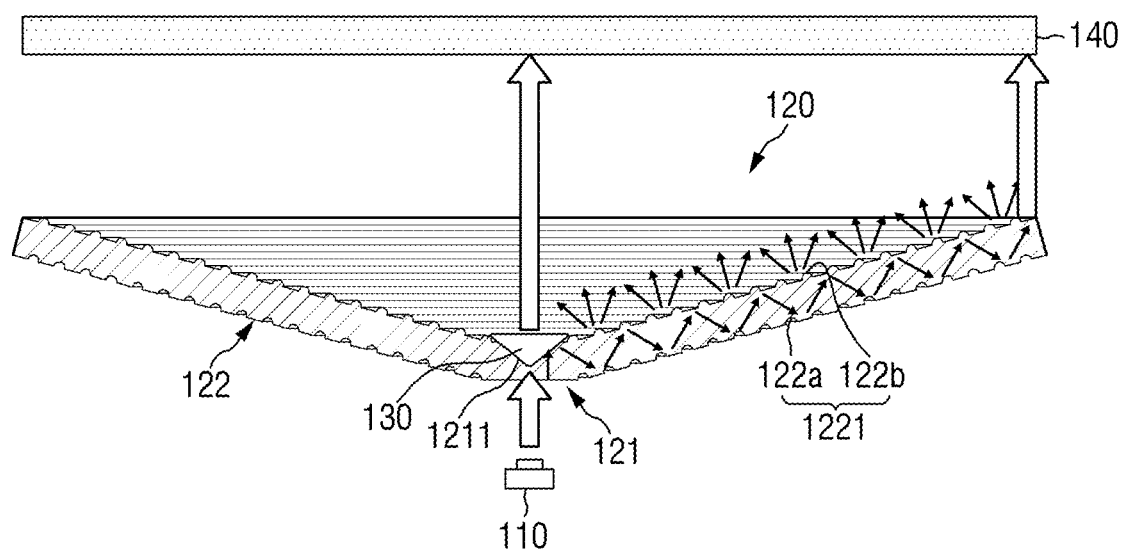
FIG. 4 is a side cross-sectional view showing a target light emitting surface of a vehicle lamp according to an embodiment of the present invention.
Figure 5:
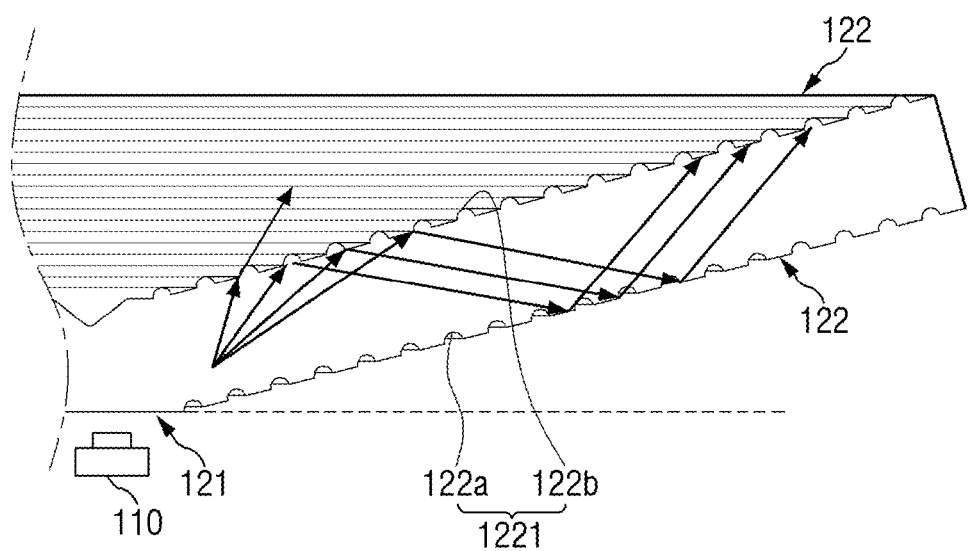
FIG. 5 is a view schematically illustrating reflection of light according to an optic unit of a vehicle lamp according to an embodiment of the present invention.
Figure 6:
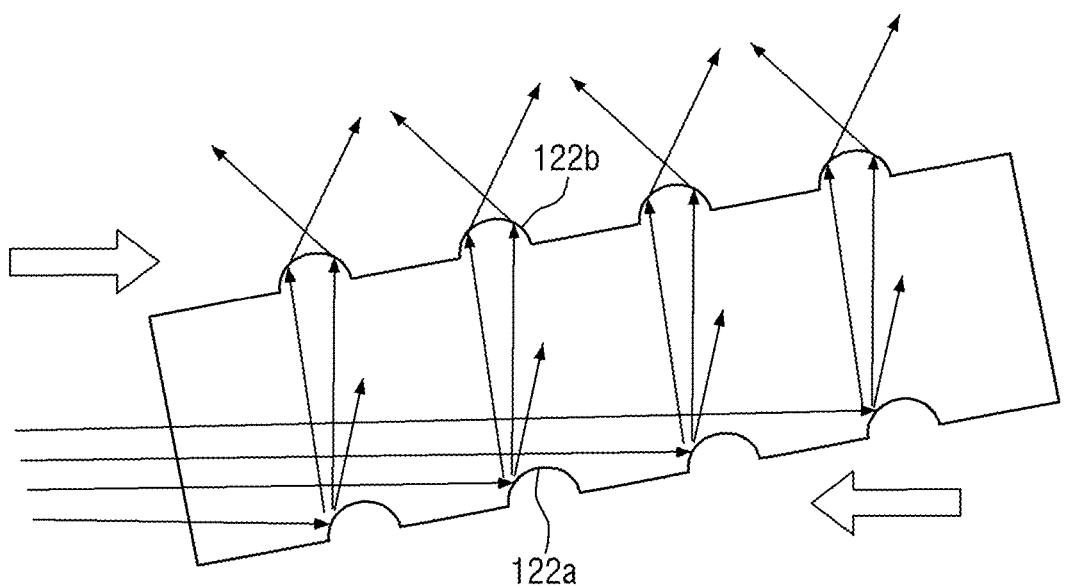
FIG. 6 is an enlarged view illustrating a light reflection pattern due to an optic unit formed in an annulus region of a vehicle lamp according to an embodiment of the present invention.

FIG. 4 is a side cross-sectional view showing the target light emitting surface 140 of the vehicle lamp 100 according to an embodiment of the present invention, and FIG. 5 is a view schematically illustrating reflection of the light due to the optic unit 1221 of the vehicle lamp 100 according to an embodiment of the present invention. FIG. 6 is an enlarged view illustrating a light reflection pattern according to the optic unit 1221 formed in the annulus region 122 of the vehicle lamp 100 according to an embodiment of the present invention.

Referring to FIGS. 4 to 6, the light guide lens unit 120 may be disposed above the light source unit 110 as described above, and may be configured such that its peripheral end has an equal distance from the light source unit 110. In addition, a target light emitting surface 140 (hereinafter referred to as a 'light emitting surface 140'), which is spaced a predetermined distance from the upper surface of the light guide lens unit 120 and is horizontally arranged, may be provided. The light guide lens unit 120 may be configured to have varying distances to the light emitting surface 140. Specifically, the light guide lens unit 120 may be formed in an inclined surface having a predetermined angle so as to be disposed closer to the light emitting surface 140 as it goes toward the outermost end from the center. In other words, the light guide lens unit 120 may have a cone shape that is concave on a side that faces the light emitting surface 140 and convex on a side that faces the light source unit 110.

As discussed above, the light guide lens unit 120 may include a central region 121 and an annulus region 122 that surrounds the central region 121. The central region 121 may be disposed above the light source unit 110 and may be formed with a flat incident surface. The light guide lens unit 120 may be required to be made thin to save the installation space of the vehicle lamp 100 within a vehicle. As such, if the incident surface of the light guide lens unit is formed concavely with respect to the light source unit 110, in order to increase the light efficiency incident to the light guide lens unit 120, the central region of the light guide lens unit 120 may become excessively thin. In addition, as will be described later, as a reflection unit 1211 is formed concavely from the upper surface of the central region 121, if the incident surface of the central region 121 of the light guide lens unit 120 is formed concavely too, the thickness thereof may become excessively thin, which may reduce the rigidity and makes manufacturing more difficult. In addition, when the incident surface of the central region 121 is formed to be convex toward the light source unit 110, the light emitted from the light source unit 110 may be concentrated to a point and form a hot spot. Accordingly, it is preferable that the central region 121 is formed with a flat incident surface to prevent hot spots while maintaining rigidity.

A reflection unit 1211 capable of reflecting the light incident from the light source unit 110 toward the peripheral end from the center of the light guide lens unit 120 may be configured in the central region 121. The reflection unit 1211 may be configured as a reflection groove that is recessed in a cone shape from the upper side of the light guide lens unit 120 toward the inside, where a separate optic is not formed. A diffusion lens unit 130 to be described later may be disposed in the reflection unit 1211, specifically on the reflection groove.

The annulus region 122 may radially extend from the central region 121 and form a predetermined inclination toward the end (i.e. periphery), and may be provided substantially in the shape of a disk. In other words, the annulus region 122 may be inclined so as to become closer to the light emitting surface 140 as it goes from the central region 121 toward the periphery. For this reason, the light rays introduced into the central region 121 may propagate to the outermost part along the inclined surface of the light guide lens unit 120 while minimizing the light loss to the outside, compared to a non-inclined, i.e., planar, light guide lens unit. Further, in such a planar configuration, the brightness of the light may be high in the central region 121, where the light source unit 110 is disposed, and may become lower as the light propagates away from the central region 121 due to the light loss or the light emission. On the other hand, as the annulus region 122 of the present invention is formed to become closer to the light emitting surface 140 as the distance from the central region 121 is increased, the illuminance uniformity can be achieved by adjusting the distance between the light guide lens unit 120 and the light emitting surface 140. To this end, the inclination angle of the annulus region 122 with respect to the light emitting surface may be predetermined to allow the light guide lens unit 120 to emit substantially uniform light to the light emitting surface 140. Herein, substantially uniform light may mean that the light intensity variation across the entire surface of the light guide lens unit 120 is less than about 50%, or about 40%, or about 30%, or about 20%, or about 10%, or about 5%, or about 4%, or about 3%, or about 2%, or about 1%.

In addition, on each of the upper and lower surfaces of the annulus region 122, an optic unit 1221 may be provided to reflect the light that is reflected from the reflection unit 1211 within the light guide lens unit 120 or to diffuse it to the exterior of the annulus region 122. Specifically, the optic unit 1221 may include a first optic 122a and a second optic 122b. The first optic 122a may be provided on a lower surface of the annulus region 122 and may be provided to be concavely and inwardly recessed in a substantially hemispherical shape on the lower surface of the annulus region 122. As the first optic 122a is concavely recessed within the annulus region 122 in an upward direction, the light incident into the light guide lens unit 120 may be reflected toward the upper surface of the annulus region 122 as the light propagates away from the central region 121.

Further, the second optic 122b may be provided on the upper surface of the annulus region 122 and may be provided to convexly protrude in a substantially hemispherical shape on the upper surface of the annulus region 122. The second optic 122b may be provided to receive the light incident into the light guide lens unit 120 so that a part of the light may diffuse and emit toward the light emitting surface 140, and the remaining part is reflected toward the first optic 122a.

Figure 7:
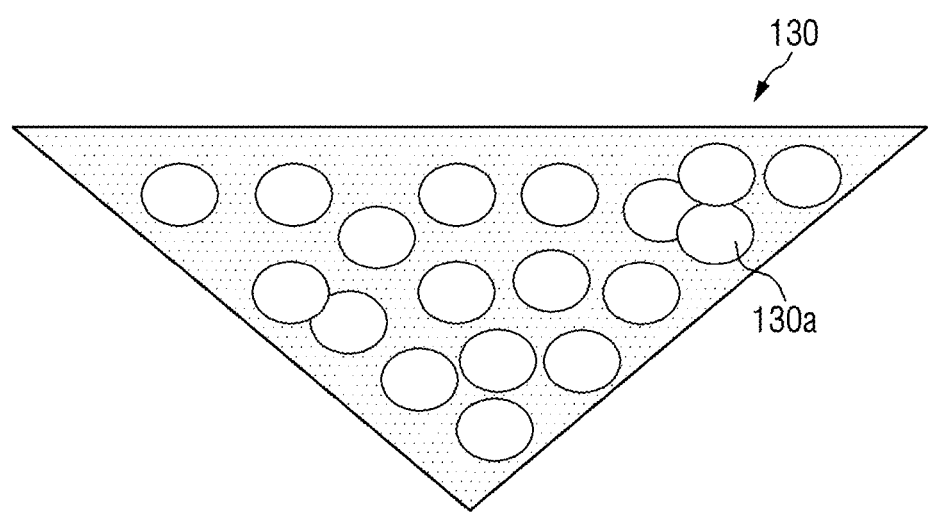
FIG. 7 is a cross-sectional view of a diffusion lens unit according to an embodiment of the present invention.
Figure 8:
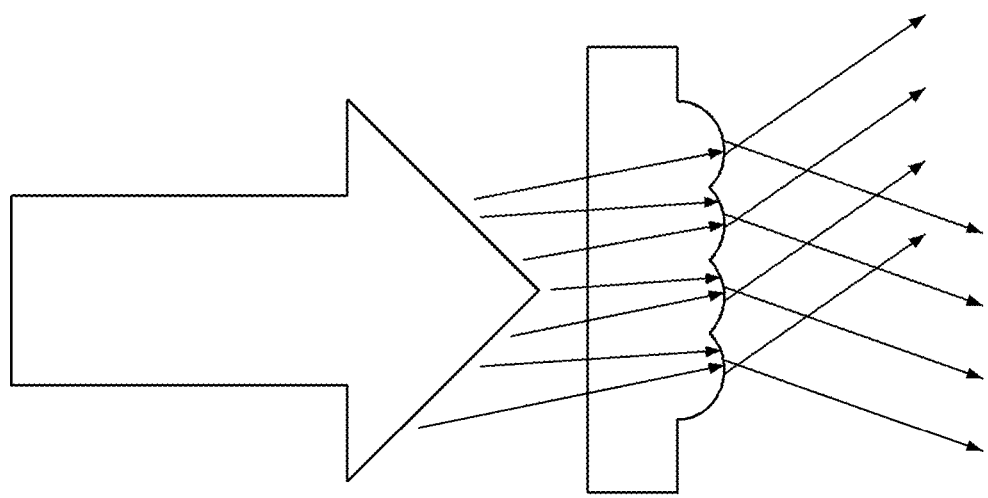
FIG. 8 compares light diffusion according to a structure in which, an optic is formed in a diffusion lens unit and a structure, in which a diffusion bead is provided in the diffusion lens unit, according to an embodiment of the present invention.
Figure 8:
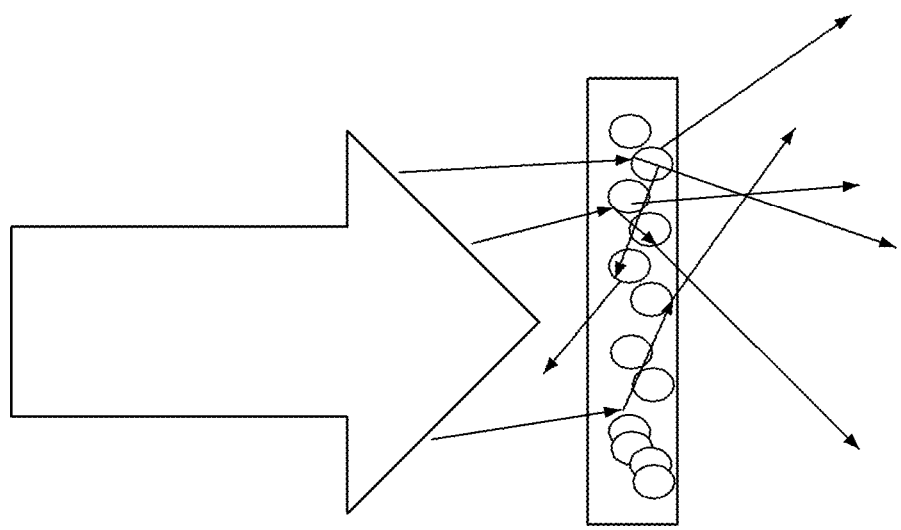

FIG. 7 is a cross-sectional view of the diffusion lens unit 130 according to an embodiment of the present invention. FIG. 8 compares light diffusion in a structure in which one or more optics are formed in the diffusion lens unit 130, and in a structure in which one or more diffusion beads 130a are provided within the diffusion lens unit 130, according to an embodiment of the present invention.

Referring to FIGS. 7 and 8, in the central region 121 of the light guide lens unit 120 according to an embodiment of the present invention, the diffusion lens unit 130, which is made of a material that is different from the material of the light guide lens unit 120, may be provided. For example, when the light guide lens unit 120 is made of the same material as the diffusion lens unit 130, a part of the light incident from the light source unit 110 may not be reflected, making it more difficult to implement uniform surface light emission over the entire area. In addition, when the diffusion lens unit 130 is made of the same material as the light guide lens unit 120, since the light does not diffuse in the central region 121 of the light guide lens unit 120, a hot spot may occur, making it more difficult to implement surface light emission. In addition, when the diffusion lens unit 130 uses the same material as the light guide lens unit 120 and implements the optics as shown in panel (a) of FIG. 8, since the light cannot be reflected radially outward, and is simply transmitted, it is more difficult to implement surface light emission.

Therefore, by employing different materials for the light guide lens unit 120 and the diffusion lens unit 130 and by including a material in the diffusion lens unit 130 capable of light diffusion, surface light emission may be facilitated more easily while also reflecting the light.

In some embodiments, the light guide lens unit 120 and the diffusion lens unit 130 may be made of the same material, and the material of the diffusion bead 130a included in the diffusion lens unit 130, which will be described later, may be made of a different material. The diffusion lens unit 130 may be disposed in the reflection unit 1211 formed on the upper surface of the central region 121 of one surface of the light guide lens unit 120, and may diffuse the light incident from the light source unit 110 toward the lateral direction and the upward direction of the light guide lens unit 120.

The diffusion lens unit 130 may be configured in a conical shape so as to be seated on the reflection unit 1211, and the lower portion of the diffusion lens unit 130 may include a seating region configured to be seated in the reflection groove of the reflection unit 1211. Further, the upper portion of the seating region may be configured to protrude a predetermined distance toward the upper side of the light guide lens unit 120. In addition, a plurality of diffusion beads 130a may be included within the diffusion lens unit 130 to diffuse the light introduced into the diffusion lens unit 130 to be emitted. For example, in comparison with a case, in which an optic is formed in the diffusion lens unit 130 as shown in panel (a) of FIG. 8, the diffusion bead 130a included within the diffusion lens unit 130 as shown in panel (b) of FIG. 8 may diffuse and reflect the light in various directions, thereby more evenly distributing the light.

The light emitted from the light source unit 110 may be introduced toward the flat incident surface below the central region 121, and some light may be reflected in the lateral direction of the light guide lens unit 120 to propagate through the diffusion lens unit 130. Some other light may be diffused upward through the diffusion lens unit 130 to be emitted therefrom.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A lamp for a vehicle comprising:
   a light source unit;
   a light guide lens unit disposed above the light source unit and configured such that an entire peripheral end thereof has a substantially constant distance from a center thereof; and
   a central lens unit disposed at a central portion of the light guide lens unit on an upper surface of the light guide lens unit,
   wherein the central lens unit includes:
      a reflection portion for reflecting a first part of light incident from the light source unit from the center of the light guide lens unit toward the peripheral end; and
      a diffusion lens portion for diffusing a second part of the light incident from the light source unit,
   wherein the second part of the light passes through the reflection portion of the central lens unit and is incident to the diffusion lens portion of the central lens unit, and
   wherein the central lens unit includes a material different from a material of the light guide lens unit.

2. The lamp of claim 1 further comprising:
   a light emitting surface disposed above and spaced apart from the light guide lens unit,
   wherein the light guide lens unit is formed to allow a distance between the light guide lens unit and the light emitting surface to be smaller as it goes from the center toward the peripheral end.

3. The lamp of claim 2, wherein the light guide lens unit comprises:
   a central region that corresponds to the light source unit and includes a flat incident surface; and
   an annulus region that radially extends from the central region and forming a predetermined inclination with respect to the light emitting surface to allow the distance between the light guide lens unit and the light emitting surface to be smaller as it goes toward the peripheral end.

4. The lamp of claim 3, wherein the annulus region of the light guide lens unit includes:
   an optic unit on the upper surface and a lower surface thereof to cause the light reflected from the reflection portion of the central lens unit to be reflected within the light guide lens unit or to be diffused to exterior of the light guide lens unit.

5. The lamp of claim 4, wherein the optic unit includes a first optic on the lower surface of the annulus region, the first optic being concavely recessed toward a direction of the upper surface of the annulus region for reflecting the light toward the upper surface of the annulus region.

6. The lamp of claim 4, wherein the optic unit includes a second optic on the upper surface of the annulus region, the second optic configured to be convex outwardly from the upper surface for diffusing and emitting a part of the light toward the light emitting surface, and for reflecting a remaining part of the light toward the first optic.

7. The lamp of claim 1, wherein the light guide lens unit includes a groove recessed in a conical shape from the upper surface to an inside, and
   wherein the central lens unit is disposed within the groove of the light guide lens unit.

8. The lamp of claim 1, wherein the central lens unit is made of a material different from the material of the light guide lens unit.

9. The lamp of claim 1, wherein the central lens unit includes a plurality of diffusion beads therewithin.

10. The lamp of claim 9, wherein the central lens unit is made of a same material as the material of the light guide lens unit, and
    wherein the plurality of diffusion beads are made of a material different from the material of the central lens unit and the light guide lens unit.

11. The lamp of claim 3, wherein the predetermined inclination is determined to allow the light guide lens unit to emit substantially uniform light to the light emitting surface.

* * * * *